(12) United States Patent
Jeon et al.

(10) Patent No.: US 11,782,792 B2
(45) Date of Patent: Oct. 10, 2023

(54) PCIE INTERFACE AND INTERFACE SYSTEM

(71) Applicant: SK hynix Inc., Icheon-si (KR)

(72) Inventors: Yong Tae Jeon, Icheon-si (KR); Dae Sik Park, Icheon-si (KR); Jae Young Jang, Icheon-si (KR)

(73) Assignee: SK HYNIX INC., Icheon-si (KR)

( * ) Notice: Subject to any disclaimer, the term of this patent is extended or adjusted under 35 U.S.C. 154(b) by 0 days.

(21) Appl. No.: 17/350,885

(22) Filed: Jun. 17, 2021

(65) Prior Publication Data

US 2022/0318094 A1    Oct. 6, 2022

(30) Foreign Application Priority Data

Apr. 5, 2021   (KR) .................. 10-2021-0044151

(51) Int. Cl.
  *G06F 11/00* (2006.01)
  *G06F 11/14* (2006.01)
  *G06F 13/42* (2006.01)

(52) U.S. Cl.
  CPC ...... *G06F 11/1443* (2013.01); *G06F 13/4282* (2013.01); *G06F 2213/0026* (2013.01)

(58) Field of Classification Search
  CPC ............. G06F 11/1443; G06F 13/4282; G06F 2213/0026
  See application file for complete search history.

(56) References Cited

U.S. PATENT DOCUMENTS

| | | | |
|---|---|---|---|
| 4,692,894 A | 9/1987 | Bemis | |
| 5,025,457 A | 6/1991 | Ahmed | |
| 5,844,891 A | 12/1998 | Cox | |
| 5,958,027 A | 9/1999 | Gulick | |
| 6,029,194 A | 2/2000 | Tilt | |
| 6,061,802 A | 5/2000 | Gulick | |
| 6,279,058 B1 | 8/2001 | Gulick | |
| 7,103,125 B1 | 9/2006 | Crutchfield et al. | |
| 7,295,578 B1 | 11/2007 | Lyle et al. | |
| 8,285,884 B1 | 10/2012 | Norrie | |
| 8,879,680 B2 | 11/2014 | Tresidder et al. | |

(Continued)

FOREIGN PATENT DOCUMENTS

| KR | 101419292 B1 | 7/2014 |
|---|---|---|
| KR | 20170124403 A | 11/2017 |

OTHER PUBLICATIONS

Froelich, Dan, et al., "PCIe® 5.0 Electrical Update", PCI-SIG 2018, 49 pages.

(Continued)

*Primary Examiner* — Philip Guyton
(74) *Attorney, Agent, or Firm* — Perkins Coie LLP

(57) ABSTRACT

A device is provided to include: a transceiver configured to transmit and receive data; and a skip ordered set (SKP OS) control logic in communication with the transceiver and configured to generate an SKP OS and control the transceiver to transmit the SKP OS and a data block to a link connecting to an external device and including a plurality of lanes. The SKP OS control logic is configured to increase or decrease transmission interval of the SKP OS based on a transmission history of the SKP OS, in response to an entry of the link to a recovery state that is used to recover the link from an error.

20 Claims, 12 Drawing Sheets

(56) References Cited

U.S. PATENT DOCUMENTS

| | | | |
|---|---|---|---|
| 9,337,934 B1 | 5/2016 | Agazzi et al. | |
| 10,862,478 B2 | 12/2020 | Hwang | |
| 2002/0024970 A1 | 2/2002 | Amaral et al. | |
| 2002/0187798 A1 | 12/2002 | Young et al. | |
| 2003/0122574 A1 | 7/2003 | Kushida | |
| 2004/0263427 A1 | 12/2004 | Horigan | |
| 2006/0209684 A1 | 9/2006 | Bei | |
| 2007/0001882 A1 | 1/2007 | Zhang et al. | |
| 2007/0011389 A1 | 1/2007 | Nishikawa | |
| 2007/0041391 A1 | 2/2007 | Lin et al. | |
| 2007/0177701 A1 | 8/2007 | Thanigasalam | |
| 2007/0204137 A1 | 8/2007 | Tran | |
| 2008/0100350 A1 | 5/2008 | Pernia | |
| 2008/0141063 A1 | 6/2008 | Ridgeway et al. | |
| 2009/0059962 A1 | 3/2009 | Schmidt et al. | |
| 2009/0317013 A1 | 12/2009 | Yang et al. | |
| 2010/0061424 A1 | 3/2010 | Germann et al. | |
| 2010/0114584 A1 | 5/2010 | Weng | |
| 2012/0140781 A1* | 6/2012 | Green | G06F 13/4295 370/503 |
| 2012/0257699 A1 | 10/2012 | Choi et al. | |
| 2013/0235887 A1 | 9/2013 | Mamidwar et al. | |
| 2013/0343528 A1 | 12/2013 | Polland et al. | |
| 2014/0006675 A1 | 1/2014 | Meir | |
| 2014/0101356 A1 | 4/2014 | Sonoda et al. | |
| 2014/0126612 A1 | 5/2014 | Tresidder et al. | |
| 2015/0350656 A1 | 12/2015 | Chung et al. | |
| 2016/0092335 A1 | 3/2016 | Boelter | |
| 2016/0139622 A1 | 5/2016 | Barner | |
| 2016/0277302 A1 | 9/2016 | Olsen | |
| 2017/0262290 A1 | 9/2017 | Yasin et al. | |
| 2018/0004686 A1 | 1/2018 | Chen | |
| 2018/0089125 A1 | 3/2018 | Berke | |
| 2018/0181457 A1 | 6/2018 | Ebisawa et al. | |
| 2018/0267850 A1 | 9/2018 | Froelich et al. | |
| 2018/0285227 A1 | 10/2018 | Sharma et al. | |
| 2018/0331864 A1 | 11/2018 | Das Sharma | |
| 2019/0041820 A1 | 2/2019 | Jones | |
| 2019/0258600 A1 | 8/2019 | Das Sharma | |
| 2020/0132760 A1 | 4/2020 | Froelich et al. | |
| 2020/0249275 A1 | 8/2020 | Froelich et al. | |
| 2020/0364108 A1 | 11/2020 | Froelich et al. | |
| 2020/0364129 A1 | 11/2020 | Das Sharma | |
| 2021/0050941 A1 | 2/2021 | Das Sharma | |
| 2021/0376716 A1 | 12/2021 | Liu | |
| 2021/0390074 A1 | 12/2021 | Park | |
| 2021/0391973 A1 | 12/2021 | Jeon et al. | |
| 2022/0022770 A1 | 1/2022 | Ouwerkerk | |

OTHER PUBLICATIONS

PCI Express Base Specification, Revision 4.0, Version 1.0, Sep. 27, 2017. PCI Express, 1293 pages.

Stumpf, M.F., "Analyzing the Real Jitter Performance of an SSC Clock." PCI SIG Developers Conference, 2018, 32 pages.

Mobin, M. et al., "PCIe Gen4 Standards Margin Assisted Outer Layer Equalization for Cross Lane Optimization in a 16GT/s PCIe Link", DesignCon 2017, 26 pages.

* cited by examiner

PCIE INTERFACE AND INTERFACE SYSTEM

CROSS-REFERENCE TO RELATED APPLICATION

This patent document claims priority to and benefits of the Korean patent application number 10-2021-0044151, filed Apr. 5, 2021, which is incorporated herein by reference in its entirety.

TECHNICAL FIELD

The technology and implementations disclosed in this patent document relates to an electronic device, and more particularly, to a peripheral component interconnect express (PCIe) interface and an interface system.

BACKGROUND

Advances in semiconductor processing and logic design have permitted an increase in the amount of logic that may be present on integrated circuit devices. As a result, computer system configurations have evolved from a single integrated circuit or a plurality of integrated circuits in one system to not only multiple cores, multiple hardware threads, and multiple logic processors on individual integrated circuits, but also other interfaces integrated in such processors. A processor or integrated circuit typically includes a single physical processor die. The processor die may include arbitrary numbers of cores, hardware threads, logic processors, interfaces, memory controller hubs, etc.

The popularity of compact computing devices has increased as a result that technological competence of forming more processing capacity in a smaller package is concentrated. However, data storage and complicated processing exceeding form factors, which are performed by compact devices, are all dependent on external devices. As a result, the competence of interconnect architectures for communication with other devices has become more important.

SUMMARY

Embodiments provide an improved peripheral component interconnect express (PCIe) interface and an interface system including the same.

In accordance with an aspect of the disclosed technology, there is provided a device that includes: a transceiver configured to transmit and receive data; and a skip ordered set (SKP OS) control logic in communication with the transceiver and configured to generate an SKP OS and control the transceiver to transmit the SKP OS and a data block to a link connecting to an external device and including a plurality of lanes, wherein the SKP OS control logic is configured to increase or decrease transmission interval of the SKP OS based on a transmission history of the SKP OS, in response to an entry of the link to a recovery state that is used to recover the link from an error.

In accordance with another aspect of the disclosed technology, there is provided an interface system that comprises: a first peripheral component interconnect express (PCIe) device; and a second PCIe device coupled and communicated with the first PCIe device through a link including a plurality of lanes, wherein the first PCIe device is configured to generate a skip ordered set (SKP OS), and increase or decrease a transmission interval of the SKP OS based on a state of an elastic buffer of the second PCIe device in response to an entry of the link into a recovery state.

BRIEF DESCRIPTION OF THE DRAWINGS

Example embodiments will now be described more fully hereinafter with reference to the accompanying drawings.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

DETAILED DESCRIPTION

Figure 1:
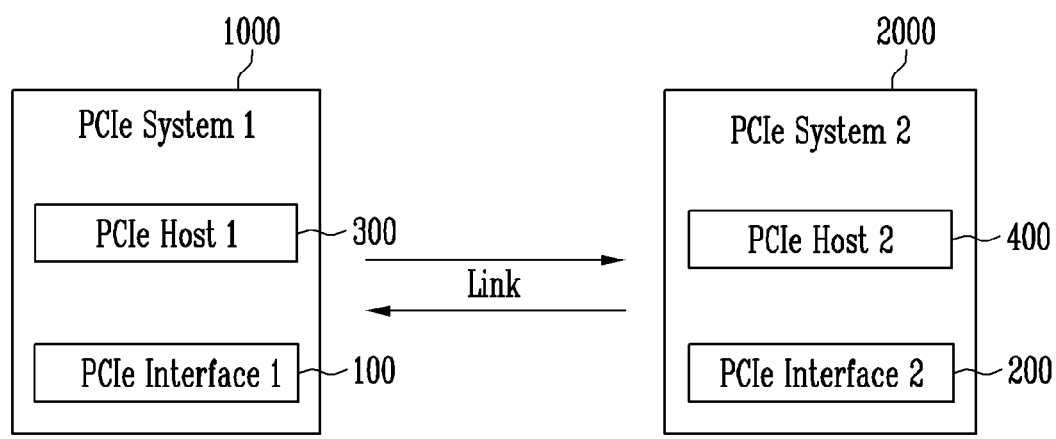
FIG. 1 is a diagram illustrating a peripheral component interconnect express (PCIe) system in accordance with an embodiment of the disclosed technology.

The devices and systems based on the disclosed technology can be implemented to receive and transmit data based on the high-speed computer bus standard of peripheral component interconnect express (PCIe) interface. FIG. 1 is a diagram illustrating a peripheral component interconnect express (PCIe) system in accordance with an embodiment of the disclosed technology.

Referring to FIG. 1, the PCIe system may include a PCIe host and a PCIe interface. Specifically, a first PCIe system 1000 may include a first PCIe interface 100 and a first PCIe host 300, and a second PCIe system 2000 may include a second PCIe interface 200 and a second PCIe host 400.

The first PCIe system 1000 or the second PCIe system 2000 may be an electronic device which supports communication using a PCIe interface. For example, the first PCIe system 1000 may be a PC, a laptop computer, or a mobile computing device. In addition, the second PCIe system 2000 may mean an expansion card, an expansion board, an adaptor card, an add-in card, or an accessary card, and each of them may mean a printed circuit board (PCB) which can be inserted into an electrical connector or an expansion slot on a mother board of the first PCIe system 1000 so as to provide an additional function to the first PCIe system 1000 through an expansion bus. Also, the second PCIe system 2000 may be a storage device such as a solid state drive (SSD), and be a graphic card, a network card, or a USB card.

The first PCIe system 1000 or the second PCIe system 2000 may perform communication by using the first PCIe interface 100 or the second PCIe interface 200. Specifically, the first PCIe system 1000 or the second PCIe system 2000 may convert data received from the first PCIe host 300 or the second PCIe host 400 into a protocol suitable for communication by using the first PCIe interface 100 or the second PCIe interface 200. The first PCIe system 1000 or the second PCIe system 2000 may form a link, and communicate with each other through the link. For example, the first PCIe system 1000 or the second PCIe system 2000 may transmit and/or receive a packet through the link.

Figure 2:
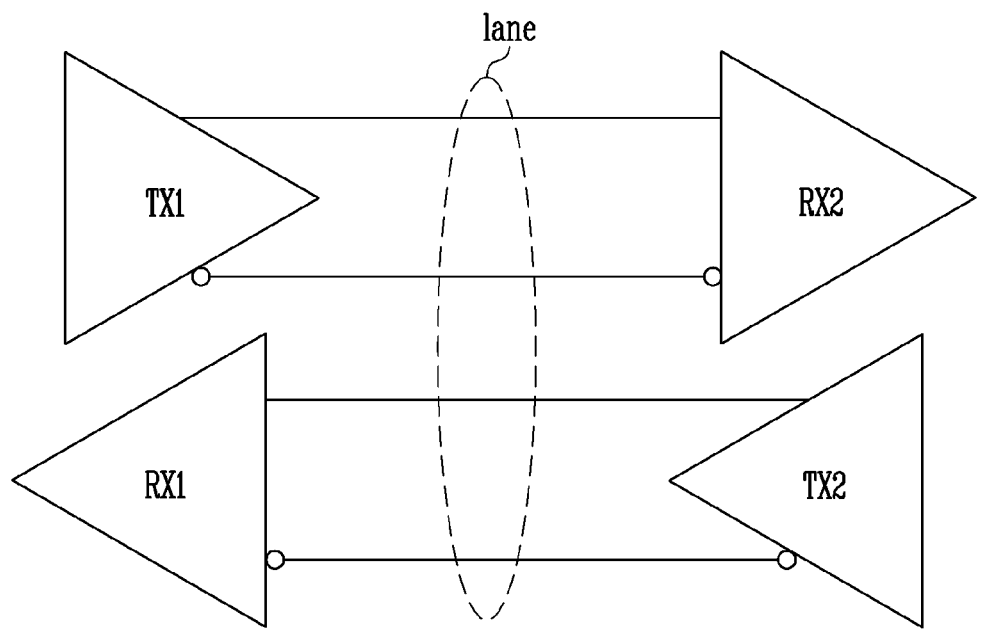
FIG. 2 is a diagram illustrating a lane in accordance with an embodiment of the disclosed technology.

FIG. 2 is a diagram illustrating a lane in accordance with an embodiment of the disclosed technology.

Referring to FIG. 2, a first transmitter TX1, a second transmitter TX2, a first receiver RX1, and a second receiver RX2 are illustrated. A lane may include a path including differentially driven signal pairs, e.g., a transmission path pair configured for transmission and a reception path pair configured for reception. A PCIe system may include a transmission logic for transmitting data to another PCIe system and a reception logic for receiving data from another PCIe system. For example, the lane may include two transmission paths connected to the first transmitter TX1 and two reception paths connected to the first receiver RX1.

The transmission path may be used for transmitting data and configured to include a transmission line, a copper line, an optical line, a wireless communication channel, an infrared communication link, or any other communication path. The reception path may be used for receiving data and configured to include a reception line, a copper line, an optical line, a wireless communication channel, an infrared communication link, or any other communication paths.

Connection between two devices, e.g., the first PCIe system 1000 and the second PCIe system 2000, may be designated as a link. The link may support one or more lanes. In some implementations, each lane may represent a set of differential signal pairs (one pair for transmission and the other pair for reception). The link may include a plurality of lanes so as to adjust a bandwidth. For example, the link may include 1 lane, 2 lanes, 4 lanes, 8 lanes, 12 lanes, 32 lanes, 64 lanes, or others.

Figure 3:
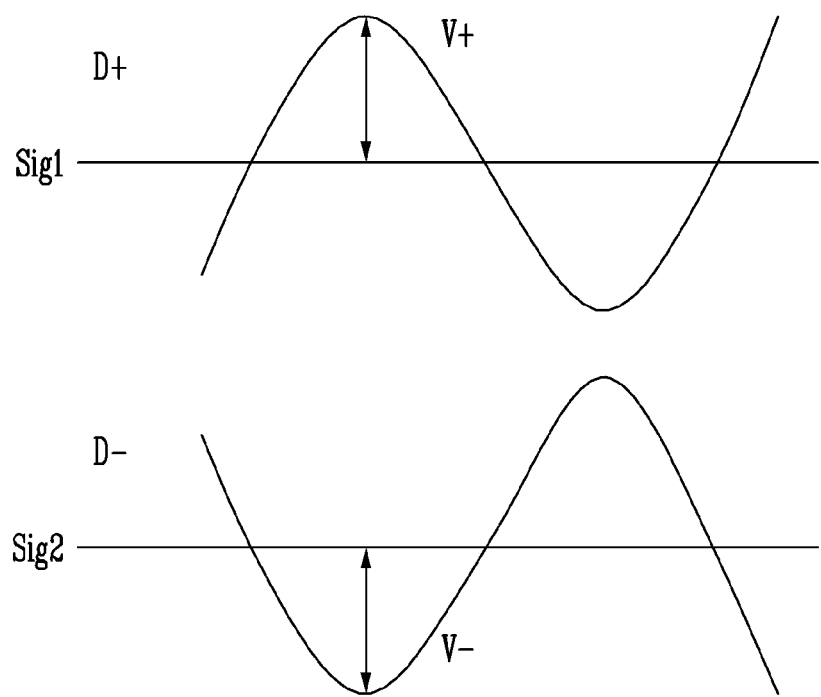
FIG. 3 is a diagram illustrating a differential signal in accordance with an embodiment of the disclosed technology.

FIG. 3 is a diagram illustrating a differential signal in accordance with an embodiment of the disclosed technology.

Referring to FIG. 3, a differential signal pair (Sig1 and Sig2) is illustrated. A PCIe system may use a differential signal pair for transmission and/or reception. The differential signal pair includes two signals which have a same frequency and a same amplitude but with phases opposite to each other. For example, when a first signal is at a rising edge at which the first signal is toggled from 0 to V+, a second signal may be at a falling edge at which the second signal is toggled from 0 to V−. The PCIe system can use signal integrity, e.g., more satisfactory electrical characteristics such as cross-coupling, voltage overshoot/undershoot, and ringing, by using the differential signal. The PCIe system can more rapidly adjust a transmission frequency.

Figure 4:
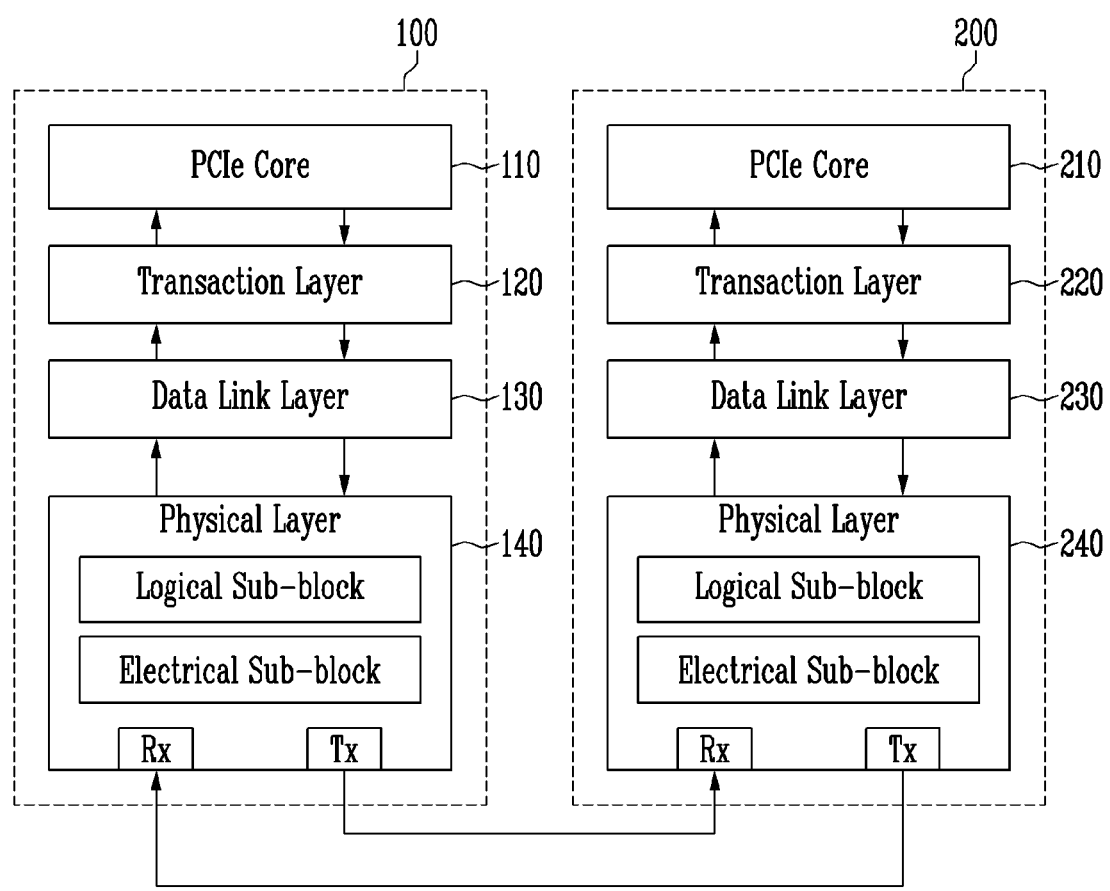
FIG. 4 is a diagram illustrating a PCIe interface in accordance with an embodiment of the disclosed technology.

FIG. 4 is a diagram illustrating a PCIe interface in accordance with an embodiment of the disclosed technology.

Referring to FIG. 4, a first PCIe interface 100 and a second PCIe interface 200 are illustrated.

PCIe layers included in the PCIe interface may include three discrete logical layers. For example, the first PCIe interface 100 may include a PCIe core 110, a transaction layer 120, a data link layer 130, and a physical layer 140. The second PCIe interface 200 may include a PCIe core 210, a transaction layer 220, a data link layer 230, and a physical layer 240. Each of the layers 120, 130, 140, 220, 230, and 240 may include two sections that include Tx and Rx. One section Tx may process outbound (or transmitted) information, and the other section RX may process inbound (or received) information. In some implementations, the PCIe interface may use packets to communicate information with other PCIe interfaces.

The PCIe core 110 or 210 may generally control the PCIe interface 100 or 200. For example, the PCIe core 110 or 210 may include a software layer for operating an interface. In some implementations, the PCIe core 110 or 210 may transmit and/or receive, to and/or from the transaction layer 120 or 220, an address, a transaction type, data, or others.

The transaction layer 120 or 220 may correspond to an upper layer in the structure of the PCIe interface. The transaction layer 120 or 220 may provide an interface between the PCIe host 300 or 400 of the PCIe system 1000 or 2000 and an interconnect architecture (e.g., the data link layer 130 or 230 and the physical layer 140 or 240). A main function of the transaction layer 120 or 220 may be or include assembling and disassembling of transaction layer packets (TLPs). In some implementations, the transaction layer 120 or 220 may implement a split transaction, i.e., a transaction which allows another traffic to be transferred through a link while a target system assembles data necessary for a response. For example, the transaction layer 120 or 220 may implement a transaction in which a request and a response are temporally separated from each other. In an embodiment, four transaction address spaces may include a configuration address space, a memory address space, an input/output address space, and a message address space. A memory space transaction may include one or more of read and write requests to transfer data to/from a memory-mapped location. In one embodiment, the memory space transaction may use two different address formats, e.g., a short address format, such as a 32-bit address, or a long address format, such as 64-bit address. A configuration space transaction may be used to access a configuration space of the PCIe devices. A transaction to the configuration space may include read and write requests. A message space transaction (or message) may be defined to support in-band communication between PCIe systems.

The transaction layer 120 or 220 may store link configuration information and others that is received from the PCIe core 110 or 210. In some implementations, the transaction layer 120 or 220 may generate a TLP requested from the PCIe core 110 or 210, or convert a received TLP into a payload or status information.

The data link layer 130 or 230 may correspond to a middle layer in the structure of the PCIe interface, and perform a function of an intermediate stage between the transaction layer 120 or 220 and the physical layer 140 or 240. A main function of the data link layer 130 or 230 may include link management and data integrity including error detection and error correction. Specifically, a transmission side of the data link layer 130 or 230 may accept TLPs assembled in the transaction layer 120 or 220, provide a data protection code, or calculate a TLP sequence number. In some implementations, the transmission side of the data link layer 130 or 230 may transmit the data protection code and the TLP sequence number to the physical layer 140 or 240 such that the data protection code and the TLP sequence number are transmitted through the link. A reception side of the data link layer 130 or 230 may check the data integrity of TLPs received from the physical layer 140 or 240, and transmit the TLPs to the transaction layer 120 or 220 so as to perform additional processing.

The physical layer 140 or 240 may include circuitry for an interface operation. The circuitry may include a driver, an input buffer, a series-parallel conversion circuit, a parallel-series conversion circuit, phase locked loops (PLLs), and an impedance matching circuit.

In some implementations, the physical layer 140 or 240 may include a logical sub-block and an electrical sub-block, which physically transmit a packet to an external PCIe system. The logical sub-block may perform a role necessary for a 'digital' function of the physical layer. In relation to this, the logical sub-block may include a transmission section for preparing sending information to be transmitted by the physical sub-block and a reception section for identifying and preparing information received before the received information is transferred to the data link layer 130 or 230. The physical layer 140 or 240 may include a transmitter TX and a receiver RX. The transmitter TX may receive a symbol, from the logical sub-block, to serialized and transmitted to an external device by the transmitter. In addition, the receiver RX may receive a serialized symbol from the external device, and convert the received symbol into a bit stream. The bit stream may be deserialized to be supplied to the logical sub-block. That is, the physical layer 140 or 240 may convert TLPs received from the data link layer 130 or 230 into a serialized format, and convert a packet received from the external device into a deserialized format. Also, the physical layer 140 or 240 may include logical functions associated with interface initialization and maintenance.

The structure of the PCIe interface 100 or 200 is exemplarily illustrated in FIG. 4 and can be modified. For example, the structure of the PCIe interface 100 or 200 may include an arbitrary form such as a quick path interconnect structure, a next generation high performance computing interconnect structure, or another hierarchical structure.

Figure 5:
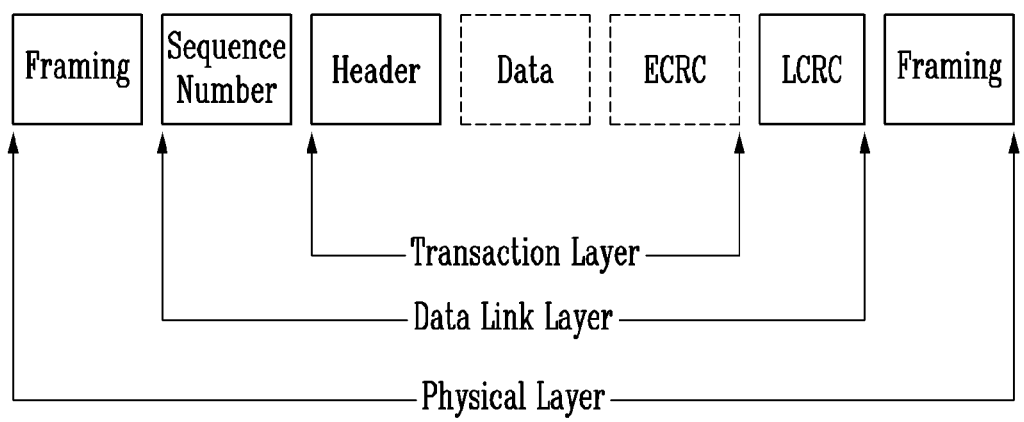
FIG. 5 is a diagram illustrating a configuration of a packet in accordance with an embodiment of the disclosed technology.

FIG. 5 is a diagram illustrating a configuration of a packet in accordance with an embodiment of the disclosed technology.

Referring to FIG. 5, each component of the packet 50 may be sequentially processed in each layer of the PCIe interface. Specifically, the packet 50 may configured with different protocols in a form processed in each layer. For example, a transaction layer packet (TLP) may be generated and processed in the transaction layer 120 or 220. The TLP may include a header field, a data field, and an end-to-end cyclic redundancy check (ECRC) field. The header field may be a field including a type of the TLP, information on whether data is to be included, information on whether a cyclic redundancy check (CRC) is to be included, and the like. In addition, the data field may be a field including data to be transmitted or received, and the ECRC field may be a field including an ECRC value representing information on an end point. In some implementations, the data field and the ECRC field may not be included in the TLP.

In addition, a data link layer packet (DLLP) may be generated and processed in the data link layer 130 or 230. The DLLP may further include a sequence number field and a link cyclic redundancy check (LCRC) field in addition to the TLP. The sequence number field may be a field including information on a sequence number of the TLP, and the LCRC field may be a field including information on an LCRC.

In addition, a physical layer packet (PLP) may be generated and processed in the physical layer 140 or 240. The PLP may further include a framing field in addition to the DLLP. The framing field may be a field including information on a serialized format.

Figure 6:
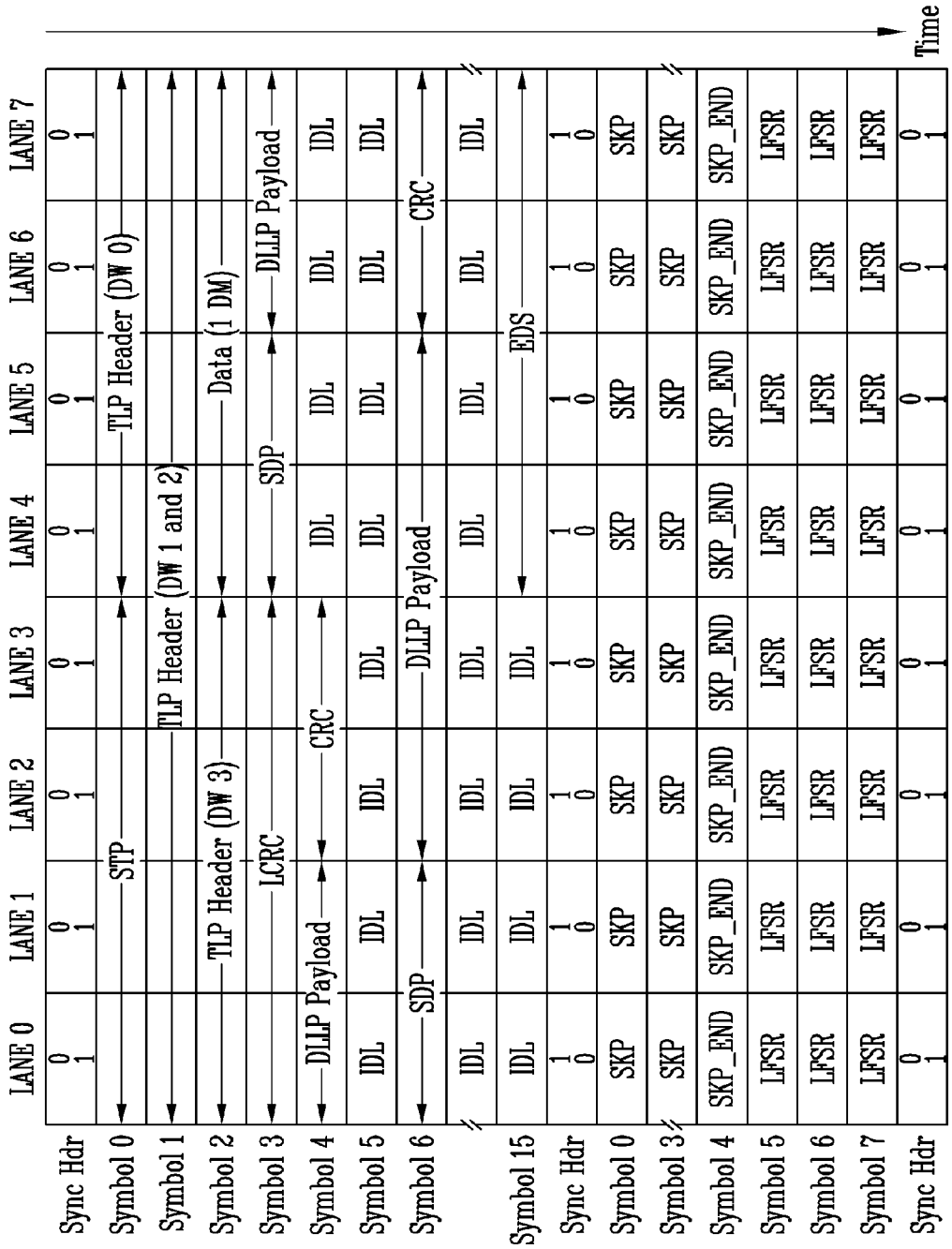
FIG. 6 is a diagram illustrating a data stream in accordance with an embodiment of the disclosed technology.

FIG. 6 is a diagram illustrating a data stream in accordance with an embodiment of the disclosed technology.

Referring to FIG. 6, a data stream transmitted through an x8 link is illustrated. The data stream may include transmission of a skip ordered set (SKP).

The data stream may start with transmission of a sync header Sync Hdr H1H=10b, which represents a data block. Therefore, a start of TLP (STP) framing token may be transmitted as a zeroth symbol representing the start of a TLP stream in lane 0 to lane 3. In addition, a TLP header and TLP data may be transmitted as a first symbol and a second symbol. A link cyclic redundancy check (LCRC) may be transmitted posterior to the TLP data, an SDP header representing that DLLP data is to be transmitted posterior to the LCRC may be transmitted as a third symbol. In addition, cyclic redundancy check (CRC) data may also be provided in relation to the DLLP data.

Subsequently, a logical idle token (IDL) representing that any data is not transmitted through the link may be transmitted. In addition, an EDS token may be transmitted to represent that data is changed to SKP OS data on the lane. For example, another sync data may be transmitted, which is encoded as "01b" representing that a subsequent block is to be an SKP OS data block.

An SKP OS may include a parity bit representing a parity state for each of lanes (e.g., zeroth to seventh lanes) of the link. The SKP OS may further include a layout that is predefined and identifiable by a receiver. For example, the SKP OS may include 16 basic symbols in the case of 128b/130b encoding in PCIe. Four SKP symbol groupings may be added or removed by a port, and the SKP OS may include 8 symbols, 12 symbols, 16 symbols, 20 symbols, 24 symbols, or the like. In addition, an SKP END symbol may be provided to represent an end position of the SKP OS on the lane and a position of a next block sync header transmitted through the lane.

Figure 7:
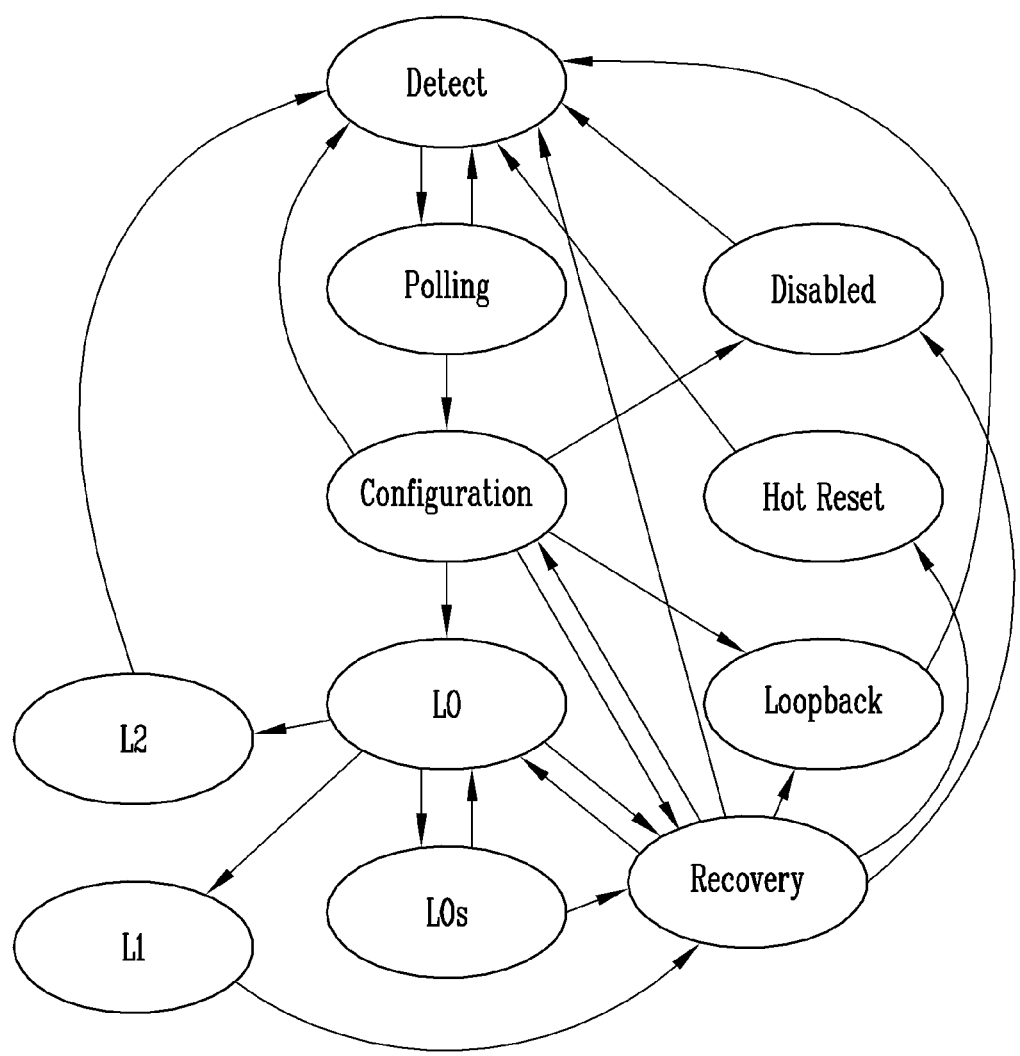
FIG. 7 is a diagram illustrating a link state of the PCIe system in accordance with an embodiment of the disclosed technology.

FIG. 7 is a diagram illustrating a link state of a PCIe system in accordance with an embodiment of the disclosed technology.

In FIG. 7, link states of the PCIe system are illustrated, which include a detect state, a polling state, a configuration state, a hot reset state, a disabled state, an L0 state, etc.

The detect state is an initialization state after a power-on reset. For example, the detect state may be entered from the configuration state, the hot reset state, the disabled state, an L2 state, a loopback state, and a recovery state. The detect state and disabled state may generally enable ultra-low power consumption while maintaining the configuration setting of a lane.

During the polling state, a lane available for data communication is identified among detected lanes. During the polling state, a polarity inversion may be checked, which includes checking Rx+ and Rx−.

During the configuration state, a lane width available for data communication is confirmed. During the configuration state, a lane inversion may be checked. The configuration state may be entered from the polling state. Alternatively, the configuration state may be entered for lanes reduction and lanes width up after the L0 state is entered.

The recovery state may be used for a reconfiguration of a link bandwidth. In the recovery state, the link bandwidth of a set link may be changed. During the recovery state, at least one of a bit lock, a symbol lock, and/or a lane-to-lane de-skew may be reset. The recovery state may be entered when an error occurs in the L0 state. The recovery state may be changed to the L0 state after the error is recovered in the recovery state.

The L0 state may be a normal operation state in which data and packets can be transmitted and received through the link. For example, the L0 state may be an operation state of a physical bus interface through which data and control packets can be transmitted and received.

An L0s state may be a power saving state which enables the physical bus interface to rapidly enter into a power conservation state and to be recovered from the power conservation state without going through any recovery state.

An L1 state may be a power saving state in which power can be actively saved. Most of transmitters and receivers may be shut off. Main power and clocks are not ensured, but auxiliary power may be used.

The loopback state may be a state used for test and malfunction separation. The loopback state is operated only in units of lanes, and a loopback reception lane is to be selected and configured.

The disabled state is to disable a set link until further notice. The hot reset state may be triggered by only a downstream port. The downstream port may use training sequences (e.g., TS1 or TS2) to propagate a hot reset.

Figure 8:
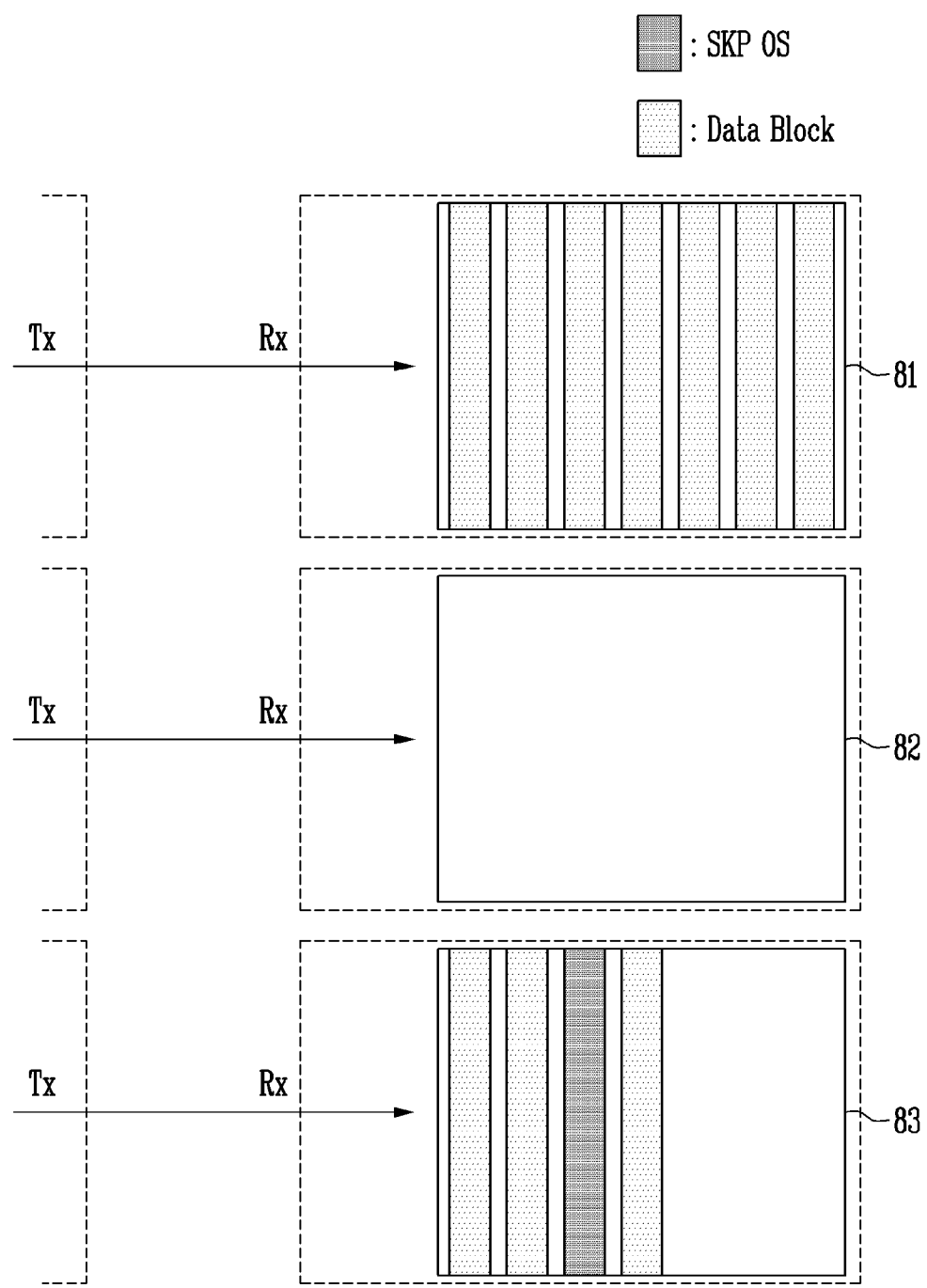
FIG. 8 is a diagram illustrating states of an elastic buffer in accordance with an embodiment of the disclosed technology.

FIG. 8 is a diagram illustrating states of an elastic buffer in accordance with an embodiment of the disclosed technology.

Referring to FIG. 8, first to third states 81 to 83 of an elastic buffer when communication is performed between PCIe systems are illustrated. The elastic buffer may temporarily store data to be transmitted or temporarily store data to be received. In some implementations, the elastic buffer may be included in each of a transmission side and a reception side. The elastic buffer may temporarily store an SKP OS and a data block.

Each of PCIe systems at the transmission and reception sides may include a clock, and the clocks included in the respective PCIe systems may be operated at different frequencies. The different frequencies may cause an overflow or underflow error. For example, the first state 81 of the elastic buffer is a case where a speed at which the data block is transmitted at the transmission side is faster than that at which the data block is received and processed at the reception side, and may be a state in which overflow occurs at the reception side. That is, the first state 81 of the elastic buffer may be a case where the clock at the transmission side is faster than that at the reception side, and the PCIe system may enter into the recovery state so as to solve an error of the overflow. That is, the communication between the PCIe system may be suspended, and the problem of large performance deterioration and data loss may occur in the PCIe system.

The second state 82 of the elastic buffer is a case where a speed at which the data block is received and processed at the reception side is faster than that at which the data block is transmitted at the transmission side, and may be a state in which underflow occurs at the reception side. That is, the second state 82 of the elastic buffer is a case where the clock at the reception side is faster than that at the transmission side, and the PCIe system may enter into the recovery state so as to solve an error of the underflow. Therefore, the problem of large performance deterioration may occur in the PCIe system.

In order to prevent the error of the overflow or the underflow, which is caused by the clock difference between the PCIe systems, the PCIe system may use a means for adding or removing special symbols.

Specifically, the PCIe system may prevent occurrence of the overflow or the underflow by using an SKP OS. In the third state 83 of the elastic buffer, an SKP OS generated at the transmission side may be transferred to the reception side. The SKP OS may be transmitted between transmissions of data blocks.

Hereinafter, rules and contents of the SKP OS will be described.

Clock Tolerance Compensation

The SKP OS may be used to compensate for a frequency difference between bit rates at two ends of the link. The elastic buffer which performs the compensation may be included in a logical sub-block of a physical layer at the reception side. A transmission interval of the SKP OS may be set based on predesigned transmission and the absolute value of a reception clock frequency difference. This specification may support two kinds of clockings having different speeds of transmitter Tx and receiver Rx reference clocks (Refclks). One clocking is separate reference clock with no SSC (SRNS), and may allow a maximum of 600 ppm difference without any separate reference clocks (SSC). In addition, the other clocking is separate reference clocks with independent SSC (SRIS), and may allow a 5600 ppm difference with respect to separate Refclks using independent SSC. However, an Refclk architecture generally uses the same Refclk with the transmitter Tx and the receiver Rx, and therefore, any difference between Refclk speeds of the transmitter Tx and the receiver Rx may not occur.

A specific form factor specification may use only the SRIS or use only the SRNS, and be allowed to provide a mechanism for selecting a clocking architecture. An upstream port may implement supporting for all combinations of the SRIS and the SRNS (including a case where any support for one of both the SRIS and the SRNS), but requirements of all related form factor specifications are to be obeyed.

A downstream port supporting the SRIS is to support the SRNS as long as the downstream port is not connected to only a specific form factor with respect to which the port modifies these requirements. A port configuration for satisfying requirements of a specific related form factor may be changed according to implementation. When a clock tolerance error is an average of 600 ppm, the clock of each of the transmitter Tx and the receiver Rx may move one clock for every 1666 clock. When the clock tolerance error is 5600 ppm, the clock of each of the transmitter Tx and the receiver Rx may move one clock for every 178 clock.

When the receiver operates with an SKP OS generated at the speed used in SRNS even though the port is executed in the SRIS, the port may set a bit at an appropriate data speed in a speed vector which supports reception of a lower SKP OS of a field of a link capabilities 2 register. When the transmitter operates with an SKP OS generated at the speed used in SRNS even though the port is executed in the SRIS, the port may set a bit at an appropriate data speed in a speed vector which supports reception of the lower SKP OS of the field of the link capabilities 2 register. System software may check whether any bit is set in a lower SKP OS reception support speed vector field before an appropriate data speed bit is set in a lower SKP OS generation vector activation field of a link partner of a link control 3 register. All software expansion devices (e.g., repeaters) existing in the link may support lower SKP OS generation such that the system software sets a bit in the lower SKP OS generation vector activation field. The configuration of software supported in the expansion device may be changed according to implementation. When an enable bit with respect to the data speed at which the link is executed is set in the lower SKP OS generation vector activation field, the transmitter may reserve generation of the SKP OS in the L0 state at the speed used in the SRNS, regardless of the clocking architecture in which the link is executed. Scheduling of the SKP OS in a link training and status state machine (LTSSM) state may be at a speed suitable for the clocking architecture.

A component supporting the SRIS may allow the elastic buffer to require a large number of requirements, as compared with a design supporting only the SRNS. These requirements may have additional time to schedule the SKP OS, when the SKP OS is transmitted just after a packet having a maximum payload size.

SKP OS for 8b/10b Encoding

When 8b/10b encoding is used, transmitted SKP OS may have three SKP symbols posterior to a COM symbol, except a case where the SKP OS is allowed in a loopback slave in a loopback-active state. Received SKP OS may have one to five SKP symbols following the COM symbol.

SKP OS for 128b/130b Encoding

When 128b/130b encoding is used, transmitted SKP OS may have 16 symbols, and received SKP OS may have 8, 12, 16, 20 or 24 symbols.

As shown in Table 1 and Table 2, two SKP OS formats may be defined with respect to the 128b/130b encoding. Both the two format may include 1 to 5 groups configured with 4 SKP symbols, in which a final group configured with 4 symbols designated as an SKP_END or SKP_END_CTL is located last. When the PCIe system operates 8.0 GT/s, only the standard SKP OS may be used. When the PCIe system operates 16.0 GT/s, both the standard SKP OS and the control SKP OS may be used. All states of specifications which do not refer a specific SKP OS format may be applied to both the two formats. When an SKP OS is transmitted, all lanes may transmit the same type of SKP OS. All the lanes may transmit the standard SKP OS or transmit the control SKP OS.

Information next to the SKP_END symbol based on an LTSSM state and a block sequence may be included in the standard SKP OS. In a Polling.Compliance state, a symbol may include error status information of the lane. Otherwise, the symbol may include an LFSR value and a data parity bit, when the SKP OS follows a data block. Additional information following three data parity bits and the SKP_END_CTL symbol may be included in the control SKP OS.

When the PCIe system operates a data speed of 8.0 GT/s, the data parity bit of the standard SKP OS may be an even-numbered parity of all data block payloads which the lane communicates, and be independently calculated for each lane. An upstream and downstream port transmitter may calculate a parity as follows.

In an embodiment, the parity may be initialized when an SDS OS is transmitted.

In an embodiment, the parity may be updated as each bit of a data block payload, after scrambling is performed.

In an embodiment, a data parity bit of the standard SKP OS, which is transmitted just next to a data block, may be set as a current parity.

In an embodiment, the parity may be initialized after the standard SKP OS is transmitted.

The upstream and downstream port receiver may calculate the parity and operate.

In an embodiment, when the SDS OS is received, the parity may be initialized.

In an embodiment, the parity may be updated as each bit of the data block payload, before de-scrambling is performed.

In an embodiment, when the standard SKP OS is received just next to the data block, each lane may compare received data parity bit with the calculated parity. When discordance is sensed, a receiver may set a lane error status register bit corresponding to a basic lane number of the lane. The discordance is not any error of the receiver, and link retrain may not be performed due to the discordance.

In an embodiment, when the standard SKP OS is received, the parity is initialized.

When the PCIe system operates at a data speed of 16.0 GT/s, the data parity bit of both the standard SKP OS and the control SKP OS may be an even-numbered parity of all data block payloads which the lane communicates, and be independently calculated for each lane. The upstream and downstream port transmitter may calculate a parity as follows.

In an embodiment, the parity may be initialized when the LTSSM is in a Recovery.Speed state.

In an embodiment, the parity may be initialized when the SDS OS is transmitted.

In an embodiment, the parity may be updated as each bit of the data block payload, after the scrambling is performed.

In an embodiment, the data parity bit of the standard SKP OS, which is transmitted just next to the data block, may be set as a current parity.

In an embodiment, a data parity of the control SKP OS, a first retimer data parity, and a second retimer parity may all be set as the current parity.

In an embodiment, the parity may be initialized after the control SKP OS is transmitted. However, the parity may not be initialized after the standard SKP OS is transmitted.

An upstream and downstream port receiver may calculate a parity and operate as follows.

In an embodiment, the parity may be initialized when the LTSSM is in the Recovery.Speed state.

In an embodiment, when the SDS OS is received, the parity may be initialized.

In an embodiment, before the de-scrambling is performed, the parity may be updated as each bit of the data block payload.

In an embodiment, when the control SKP OS is received, each lane may compare received parity bit of first retimer data with the calculated parity. When discordance is sensed, the receiver may set a bit of a register representing a discordance state of the first retimer data parity of the port corresponding to the basic lane number of the lane. The discordance is not any error of the receiver, and link retrain may not be performed due to the discordance.

In an embodiment, when the control SKP OS is received, each lane may compare received parity bit of second retimer data with the calculated parity. When discordance is sensed, the receiver may set a bit of a register representing a discordance state of the second retimer data parity of the port corresponding to the basic lane number of the lane. The discordance is not any error of the receiver, and link retrain may not be performed due to the discordance.

In an embodiment, when the standard SKP OS is received just next to the data block, the receiver may compare received data parity bit with the calculated parity. However, the comparison result has no influence on the state of the register, which represents the lane error status.

In an embodiment, the parity may be initialized when the control SKP OS is received. However, the parity may not be initialized when the standard SKP OS is received.

TABLE 1

Table 1: Standard SKP OS in 128b/130b encoding

| Symbol number | Value | Contents |
|---|---|---|
| (4*N − 1) at 0 [N is 1 to 5] | AAh | SKP symbol Symbol 0 is SKP OS identifier |
| 4*N | E1h | SKP_END symbol represents end of SKP OS, after three additional symbols |
| 4*N + 1 | 00-FFh | (i) When LTSSM state is Polling.Compliance state: AAh (ii) When previous block is data block: Bit [7] = data parity Bit [6:0] = LFSR [22:16] (iii) Others: Bit [7] = −LFSR [22] Bit [6:0] = −LFSR [22:17] |
| 4*N + 2 | 00-FFh | (i) When LTSSM state is Polling.Compliance state: Error Status [7:0] (ii) Others: LFSR [15:8] |
| 4*N + 3 | 00-FFh | (i) When LTSSM state is Polling.Compliance state: −Error Status [7:0] (ii) Others: LFSR [7:0] |

The control SKP OS may be different from the standard SKP OS configured with last four symbols. In addition to the data parity bit calculated by the upstream and downstream port, the parity bit calculated by each retimer may be used for communication. In addition, the parity bit may be used for a lane margin of a retimer receiver as described below.

TABLE 2

Table 2: Control SKP OS in 128b/130b encoding

| Symbol number | Value | Technique |
|---|---|---|
| (4*N − 1) at 0 [N is 1 to 5] | AAh | SKP symbol Symbol 0 is SKP OS identifier |
| 4*N | 78 hours | SKP_END_CLT symbol represents end of SKP OS, after three additional symbols |
| 4*N + 1 | 00-FFh | Bit 7: data parity Bit 6: first retimer data parity Bit 5: second retimer parity Bit [4:0]: margin CRC [4:0] |
| 4*N + 2 | 00-FFh | Bit 7: margin parity |

'Margin CRC [4:0]' may be calculated in bits [6] of symbols 4N+2 (d[0] may be bit 0 of the symbols 4N+2, d[1] may be bit 1 of the symbols 4N+2, . . . , and d[6] may be bit 6 of the symbols 4N+2), and bits [7:0] of symbols 4N+3 (d[7] may be bit 0 of the symbols 4N+3, d[8] may be bit 1 of the symbols 4N+3, . . . , and d[14] may be bit 7 of the symbols 4N+3).

Margin CRC [0]=d [0] ˆ d [3] ˆ d [5] ˆ d [6] ˆ d [9] ˆ d [10] ˆ d [11] ˆ d [12] ˆ d [13]

Margin CRC [1]=d [0] ˆ d [4] ˆ d [6] ˆ d [7] ˆ d [10] ˆ d [11] ˆ d [12] ˆ d [13] ˆ d [14]

Margin CRC [2]=d [0] ˆ d [2] ˆ d [3] ˆ d [6] ˆ d [7] ˆ d [8] ˆ d [9] ˆ d [10] ˆ d [14]

Margin CRC [3]=d [1] ˆ d [3] ˆ d [4] ˆ d [7] ˆ d [8] ˆ d [9] ˆ d [10] ˆ d [11]

Margin CRC [4]=d [2] ˆ d [4] ˆ d [5] ˆ d [8] ˆ d [9] ˆ d [10] ˆ d [11] ˆ d [12]

'Margin Parity' may be an even-numbered parity of the bits [4:0] of symbols 4N+1, the bits [6:0] of symbols 4N+2, and the bits [7:0] of symbols 4N+3. (i.e., Margin parity=Margin CRC [0] ˆ Margin CRC [1] ˆ Margin CRC [2] ˆ Margin CRC [3] ˆ Margin CRC [4] ˆ d [0] ˆ d [1] ˆ d [2] ˆ d [3] ˆ d [4] ˆ d [5] ˆ d [6] ˆ d [7] ˆ d [8] ˆ d [9] ˆ d [10] ˆ d [11] ˆ d [12] ˆ d [13] ˆ d [14]).

Error Protection of Control SKP OS 21 bits of the symbols 4N+1 (bits [4:0]), the symbols 4N+2 (bits [7:0]), and the symbols 4N+3 (bits [7:0]) may include a CRC of 5 bits and a parity of 1 bit, and leave 15 bits for information transfer. While the parity bit may provide sensing on an odd-numbered bit flip (e.g., bit 1 or bit 3), the CRC may provide ensured sensing of 1-bit and 2-bit flips. Thus, triple bit flip sensing on 21 bits and bust error sensing of length 5 can be ensured. The 5-bit CRC may be derived from a polynomial expression, i.e., $x^5+x^2+1$.

The 21 bits is not a portion of a TLP, and therefore, transfer may be ensured when the same content is repeatedly transferred. This may be achieved through a structuralized register. While a downstream command may be transferred from a downstream port reflecting contents of an architecture register, an upstream state passing through an error test may be updated through a status register of the downstream port. Therefore, a mechanism which executes a command and wait for a state to be again reflected before a new command is executed may exist in software. Accordingly, the 15-bit information may serve as a micro packet.

Transmitter Standard

In an embodiment, all lanes may transmit a symbol at the same frequency (the difference between bit rates in all multi-lane links may be 0 ppm).

In an embodiment, an SKP OS having the same length may be simultaneously transmitted in all lanes of a multi-lane link, except a case where a loopback slave is allowed in a loopback activation LTSSM state in the transmission.

In an embodiment, when the 8b/10b encoding is used:
  in a case where the link does not operation in the SRIS, or a bit corresponding to a current link speed is set in the lower SKP OS generation vector activation field, and the LTSSM is in the L0 state, an SKP OS may be scheduled to be transmitted at an interval of 1118 symbol times to 1538 symbol times.
  in the case where the link is operating in the SRIS, the bit corresponding to the current link speed is cleared in the lower SKP OS generation vector activation field, or the LTSSM is not in the L0 state, the SKP OS may be scheduled to be transmitted at an interval of less than 154 symbol times.

In an embodiment, when the 128b/130b encoding is used:
  in a case where the link does not operation in the SRIS, or the bit corresponding to the current link speed is set in the lower SKP OS generation vector activation field, and the LTSSM is in the L0 state, the SKP OS may be scheduled to be transmitted at an interval of 370 blocks to 375 blocks. A loopback slave may operate to satisfy this requirement, until the loopback slave starts looping back a received bit stream.
  in the case where the link is operating in the SRIS, the bit corresponding to the current link speed is cleared in the lower SKP OS generation vector activation field, or the LTSSM is not in the L0 state, the SKP OS may be scheduled to be transmitted at an interval shorter than 38 blocks. The loopback slave may operate to satisfy this requirement, until the loopback slave starts looping back a received bit stream.

in a case where the LTSSM is in the loopback state, and the link does not operate in the SRIS, a loopback master may be scheduled to transmit two SKP OSs spaced apart from each other by a maximum of two blocks at an interval of 370 blocks to 375 blocks.

in a case where the LTSSM is in the loopback state, and the link is operating in the SRIS, the loopback master may be scheduled to transmit two SKP OSs spaced apart from each other by a maximum of two blocks at an interval of less than 38 blocks.

The control SKP OS may be transmitted at only the following time.

When the data speed is 16.0 GT/s, and a data stream is transmitted, the standard SKP OS and the control SKP OS may be alternately transmitted with respect to the SKP OS transmitted within the data stream.

When the data speed is 16.0 GT/s, and the LTSSM is in a Configuration.Idle state or a Recovery.Idle state, the above-described requirement of a minimum constant interval may not be applied to instant transmission of the control SKP OS. The transmitter may reset a scheduling interval timer of the SKP OS, after the transmitter transmits an instance of the control SKP OS.

In an embodiment, the scheduled SKP OS is to be transmitted even when a packet or an ordered set (OS) is not under progress. Otherwise, the SKP OS may be accumulated. Therefore, the SKP OS may be continuously inserted into a boundary of a next packet or a next OS. For reference: when the 128b/130b encoding is used, the SKP OS cannot be transmitted in continuous blocks within the data stream.

In an embodiment, when continuous symbols or OSs are monitored, the SKP OS may not be calculated due to suspension (e.g., 8 continuous TS1 Oss in a Polling.Active state).

In an embodiment, when the 8b/10b encoding is used: the SKP OS may not be transmitted, in a case where the compliance SOS bit of a link control 2 register is 0b while a compliance pattern or a modified compliance pattern is under progress in the Polling.Compliance state. When the 8b/10b encoding is used, two (instead of one) continuous SKP OSs may be transmitted with respect to all SKP OS time intervals scheduled while the compliance pattern or the modified compliance pattern is under progress, in a case where the compliance SOS bit of the link control 2 register is 1b.

In an embodiment, when the 128b/130b encoding is used: a compliance SOS register bit has no effect. During the Polling.Compliance state, the transmitter may transmit only an SKP OS designated as a specific portion in the modified compliance pattern.

In an embodiment, when the transmitter is electrically in an idle state, a counter or another mechanism, used to reserve an SKP OS may be reset.

Receiver Rules

In an embodiment, when the 8b/10b encoding is used, the receiver may recognize an SKP OS received as has already been decided. When the 128b/130b encoding is used, the receiver may recognize an SKP OS received as has already been decided.

In an embodiment, the length of the received SKP OS may not be changed for each lane of a multi-lane link, except a case occurring during a Loopback.Active state.

In an embodiment, the receiver may receive and process the SKP OS at an interval of an average of 1180 to 1538 symbol times, when the link in the lower SKP OS receiver supporting the speed vector field does not operate in the SRIS, or when the link does not operate in a bit for a set current link speed, and when the 8b/10b encoding is used. Also, when the 128b/130b encoding is used, the receiver may receive and process the SKP OS at an interval of an average of 370 to 375 blocks. When the link operates in the SRIS and when the 8b/10b encoding is used, the receiver may receive and process the SKP OS at an interval of an average of 154 symbol times. Also, when the 128b/130b encoding is used, the receiver may receive and process the SKP OS at an interval of less than an average of 38 blocks.

In some implementations, the transmitter which is electrically in the idle state does not require resetting of mechanism for time-based scheduling of the SKP OS. Hence, after the receiver is electrically in the idle state, the receiver may receive and process a firstly scheduled SKP OS within a time shorter than an average time interval of the SKP OS.

In an embodiment, in the case of a data speed of 8.0 GT/s or more, the receiver in the L0 state may check whether any data block having an EDS token exists prior to each SKP OS.

In an embodiment, the receiver may continuously receive and process the SKP OS at data speeds of 2.5 GT/s and 5.00 GT/s.

The receiver may receive and process the SKP OS at a maximum interval according to Max_Payload_Size supported by a component thereof. In the case of the data speeds of 2.5 GT/s and 5.00 GT/s, a formula with respect to a maximum symbol number N between SKP OSs may be N=1538+(Max_payload_size_byte+28). For example, when the Max_Payload_Size is 4096 bytes, N=1538+4096+28=5662.

Figure 9:
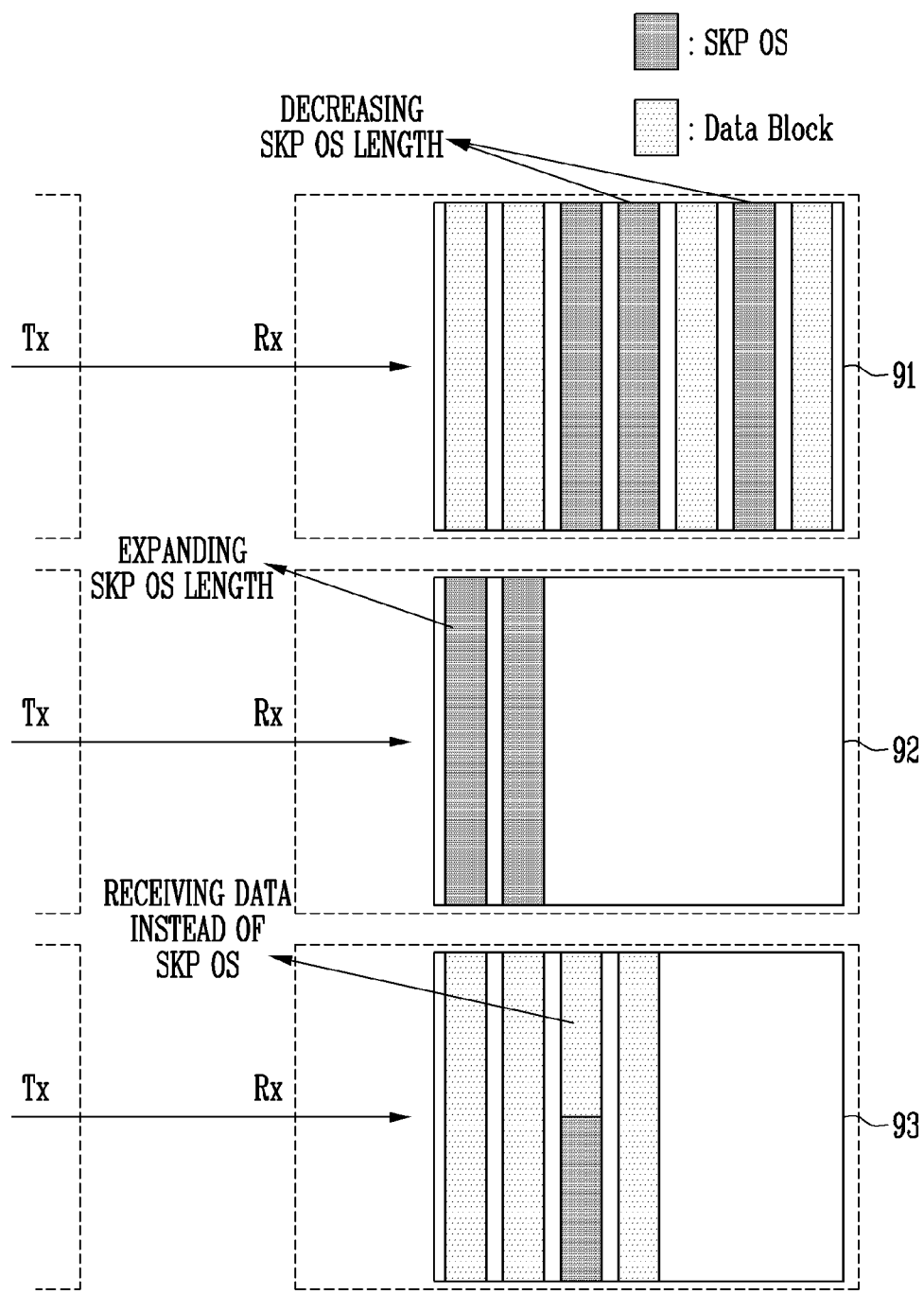
FIG. 9 is a diagram illustrating states of an elastic buffer in accordance with an embodiment of the disclosed technology.

FIG. 9 is a diagram illustrating states of an elastic buffer in accordance with an embodiment of the disclosed technology.

Referring to FIG. 9, first to third states 91 to 93 of an elastic buffer when communication is performed between PCIe systems are illustrated.

The elastic buffer may temporarily store data to be transmitted or temporarily store data to be received. Specifically, the elastic buffer may be included in each of a transmission side and a reception side. The elastic buffer may temporarily store an SKP OS and a data block. The PCIe system may prevent occurrence of overflow or underflow by using the SKP OS. Specifically, in Gen3 or more in Gen3/4/5 PCIe-based specifications, the PCIe system may transmit the SKP OS for every 370 to 375 data block in the case of a common reference clock or the SRNS. The PCIe system may transmit the SKP OS every 37 data blocks in the case of the SRIS. However, transmission of the SKP OS without considering a clock difference between the PCIe systems may result in performance deterioration caused by an unnecessary SKP OS. Specifically, the overflow or the underflow cannot be prevented in the case of the SRNS in which the clock difference between the PCIe systems is 600 ppm or more. Also, the overflow or the underflow cannot be prevented in the case of in the SRIS in which the clock difference between the PCIe systems is 5600 ppm or more.

In accordance with an embodiment of the disclosed technology, an optimum SKP OS interval may be applied in real time regardless of the common reference clock, the SRNS, or the SRIS. In an embodiment, when the PCIe systems use an SRNS mode or an SRIS mode, performance may be improved by removing an unnecessary SKP OS. Alternatively, the PCIe system may be prevented from entering into the recovery state by adding SKP OSs of which number corresponding to an optimum number when SKP OSs are further required, and data loss may be prevented by preventing linkdown.

Referring to the first state 91 of the elastic buffer, the PCIe system at the transmission side may transmit the data block and the SKP OS by adding SKP OSs of which quantity is greater than that of conventional SKP OSs, and the elastic buffer at the reception side may remove the added SKP OSs. When a clock at the transmission side is faster than that at the reception side in the SRIS or the SRNS, the elastic buffer at the reception side removes the added SKP OSs, so that the occurrence of the overflow can be prevented. In addition, an additional SKP OS is generated at the transmission side, so that the transmission speed of the data block can be reduced. Further, data loss or entrance into the recovery state can be prevented. When the SKP OS is removed, the PCIe system cannot remove all SKP OS existing in the elastic buffer. The PCIe system may decrease the length of the SKP OS by removing only some of the SKP OSs existing in the elastic buffer according to PCI/PCIe rules.

Referring to the second state 92 of the elastic buffer, the elastic buffer at the reception side may prevent the occurrence of the underflow by expanding the length of the received SKP OS. Specifically, when a clock at the reception side is faster than that at the transmission side in the SRIS or the SRNS, the elastic buffer at the reception side may prevent the occurrence of the underflow by adding an SKP OS. In some implementations, the elastic buffer at the reception side may add an SKP OS only when the SKP OS is received from the transmission side.

Referring to the third state 93 of the elastic buffer, the PCIe system at the transmission side may transmit SKP OSs of which quantity is smaller than that of conventional SKP OSs, so that PCIe maximum efficiency can be achieved. Specifically, when the transmission side and the reception side hardly have a clock difference (e.g., in the case of the common reference clock), the probability that the overflow or the underflow will occur is extremely low. Therefore, the data block instead of the SKP OS is transmitted, so that communication efficiency can be maximized.

Figure 10:
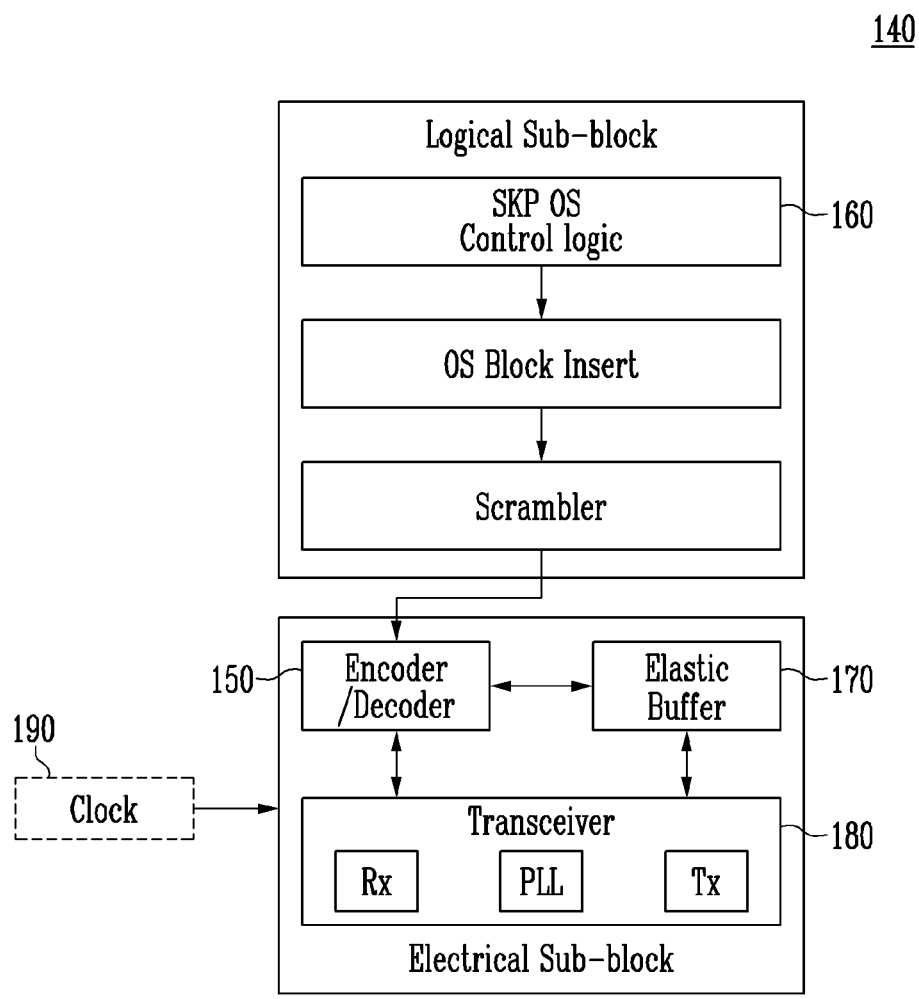
FIG. 10 is a diagram illustrating a configuration of a physical layer in accordance with an embodiment of the disclosed technology.

FIG. 10 is a diagram illustrating a configuration of a physical layer in accordance with an embodiment of the disclosed technology.

Referring to FIG. 10, the physical layer 140 may include components for transmitting a packet to an external PCIe system. Specifically, the physical layer 140 may include an encoder/decoder 150, an SKP OS control logic 160, an elastic buffer 170, a transceiver 180, and a clock signal generator 190.

The encoder/decoder 150 may be a component for performing encoding and decoding on a packet for the purpose of serialization and deserialization. For example, the encoder/decoder 150 may encode a DLLP received from the data link layer 130, and the physical layer 140 may convert the encoded DLLP into a serialized format. Also, the encoder/decoder 150 may decode a packet received from an external device.

The SKP OS control logic 160 may generate an SKP OS and control a transmission interval. In some implementations, the SKP OS control logic 160 may generate the SKP OS. The SKP OS control logic 160 may control the transceiver 180 to control the transmission interval. The SKP OS control logic 160 will be described in detail with reference to FIG. 11.

The elastic buffer 170 may temporarily store a packet received from the external device. For example, the elastic buffer 170 may temporarily store an SKP OS and a data block, which are received through the transceiver 180. Also, the elastic buffer 170 may remove or add the received SKP OS. For example, since the PCIe system may enter the recovery state in an overflow state or an underflow state. Therefore, the elastic buffer 170 may remove the temporarily stored SKP OS so as to prevent the overflow state in which a volume becomes largest. Also, the elastic buffer 170 may add the received SKP OS so as to prevent the underflow state in which the volume becomes smallest.

The transceiver 180 may include a phase locked loop (PLL) circuit, a transmitter Tx, and a receiver Rx. The PLL circuit may generate a clock signal to be supplied to the transmitter Tx or the receiver Rx by using a clock signal provided from the clock signal generator 190. The PLL circuit may generate a clock signal with a changed frequency by multiplying a signal received from the clock signal generator 190. For example, the PLL circuit may multiply a reference clock signal REFCLK having a frequency of 100 MHz into a clock signal having a frequency of 2.5 GHz. The transmitter Tx may convert a parallel data signal into a serial data signal by using an output signal of the PLL circuit, and transmit the serial data signal to the external device, e.g., the external PCIe system. The receiver Rx may receive a serial data signal transmitted from the external device, and generate a clock signal for recovering the received serial data signal and a clock signal for converting the recovered serial data signal into a parallel data signal by using the output signal of the PLL circuit.

The clock signal generator 190 may generate a reference clock signal REFCLK used for an operation of the PCIe interface. The operation of the PCIe interface may communicate with the external device. For example, the clock signal generator 190 may automatically detect whether a clock signal is supplied from the PCIe system, and generate an internal clock signal, based on a detection result. When a clock signal is provided from the PCIe system, the clock signal generator 190 may use the clock signal received from the PCIe system. In some implementations, the clock signal generator 190 may transmit the reference clock signal REFCLK to the SKP OS control logic 160 and the transceiver 180.

Figure 11:
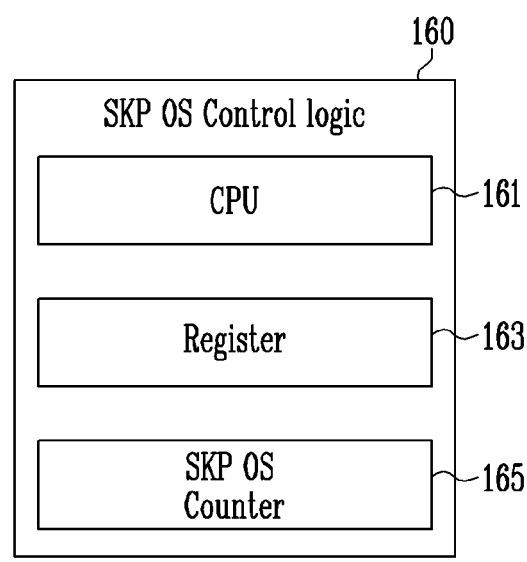
FIG. 11 is a diagram illustrating a skip ordered set (SKP OS) control logic in accordance with an embodiment of the disclosed technology.

FIG. 11 is a diagram illustrating an SKP OS control logic in accordance with an embodiment of the disclosed technology.

Referring to FIG. 11, the SKP OS control logic 160 may include a central processing unit (CPU) 161, a register 163, and an SKP OS counter 165.

The CPU 161 may generally control operations for generating and removing an SKP OS. For example, the CPU 161 may control the transceiver to increase or decrease a transmission interval of the SKP OS. In some implementations, the CPU 161 may control the transmission interval of the SKP OS in response to recovery state entrance or a recovery state entrance request. In some implementations, the CPU 161 may calculate a frequency of recovery state entrance corresponding to the transmission interval. The CPU 161 may increase or decrease the transmission interval of the SKP OS, based on the frequency of the recovery state entrance. The CPU 161 may increase or decrease the transmission interval only a predetermined number. When the PCIe system does not enter into the recovery state for a predetermined time, the CPU 161 may store a current SKP OS transmission interval in the register 163, and fix the transmission interval of the SKP OS.

The CPU 161 may determine whether the recovery state entrance has occurred due to an increase or decrease in the transmission interval of the SKP OS. In some implementations, a link state of the PCIe system may enter into the recovery state by a request of another PCIe system linked with the PCIe system. For example, when the PCIe system receives training sequence TS1 transmitted from the another PCIe system, the PCIe system may enter into the recovery system. When the PCIe system enters into the recovery state, the CPU 161 may check the reason why the PCIe system enters into the recovery state. In some implementations, the CPU 161 may check the reason why the PCIe system enters into the recovery state from another PCIe system according to the following sequence. In some implementations, the CPU 161 may identify that the PCIe system enters into the recovery state due to the increase or decrease in the transmission interval of the SKP OS, when the recovery state does not correspond to the following cases:

1. Speed change request
2. Re-equalization request
3. Lane reduce or lane upconfigure request
4. Hot reset, disabled or loopback request
5. Replay timeout or replay rollover The speed change request may be made by any one of connected ports to request a speed change (e.g., a speed change request from Gen1 to Gen3). Any one of the connected ports may request the speed change by setting a speed change bit of TS1 or TS2 to 1. The re-equalization request may be made by any one of the connected ports to request a change of an EQ coefficient. Any one of the connected ports may request re-equalization by setting a request equalization bit of TS2 to 1. In addition, the lane reduce or lane upconfigure request may be made by any one of the connected ports to request an increase or decrease of a lane width. For example, the lane reduce or lane upconfigure request may request a change from lane 1 to lane 4 or a change from lane 4 to lane 1. The hot reset, disabled or loopback request is a state change request made by any one of the connected ports. Any one of the connected ports may request a state change by setting a hot reset bit, disable bit, or loopback bit to 1. The replay timeout or replay rollover may be made to request a recovery state entrance from a port receiving a certain number or more of negative acknowledges (NAKs) to a state port, when an LCRC error occurs.

When the recovery state entrance corresponds to the increase in the transmission interval of the SKP OS, the CPU 161 may decrease the transmission interval by ½ of an increment of the transmission interval. In some implementations, the CPU determines that the recovery state entrance corresponds to the increase of the transmission interval of the SKP OS based on whether the CPU has previously increased the transmission interval. When the recovery state entrance corresponds to the decrease in the transmission interval of the SKP OS, the CPU 161 may increase the transmission interval by ½ of a decrement of the transmission interval. In some implementations, the CPU determines that the recovery state entrance corresponds to the decrease of the transmission interval of the SKP OS based on whether the CPU has previously decreased the transmission interval. The CPU 161 may control the transmission interval, based on an elastic buffer state of the external device.

The register 163 may store a transmission history of the SKP OS. In some implementations, the register 163 may store the transmission history including the transmission interval of the SKP OS, a transmission interval control number of the SKP OS, which is counted by the SKP OS counter 165, a change in transmission interval of the SKP OS for each time, a recovery state entrance frequency per unit time, and the like.

The SKP OS counter 165 may count transmission of the SKP OS. The SKP OS counter 165 may provide the CPU 161 or the register 163 with information representing that the SKP OS has been transmitted. In some implementations, the CPU 161 may calculate the transmission interval of the SKP OS, based on the information provided by the SKP OS counter 165.

Figure 12:
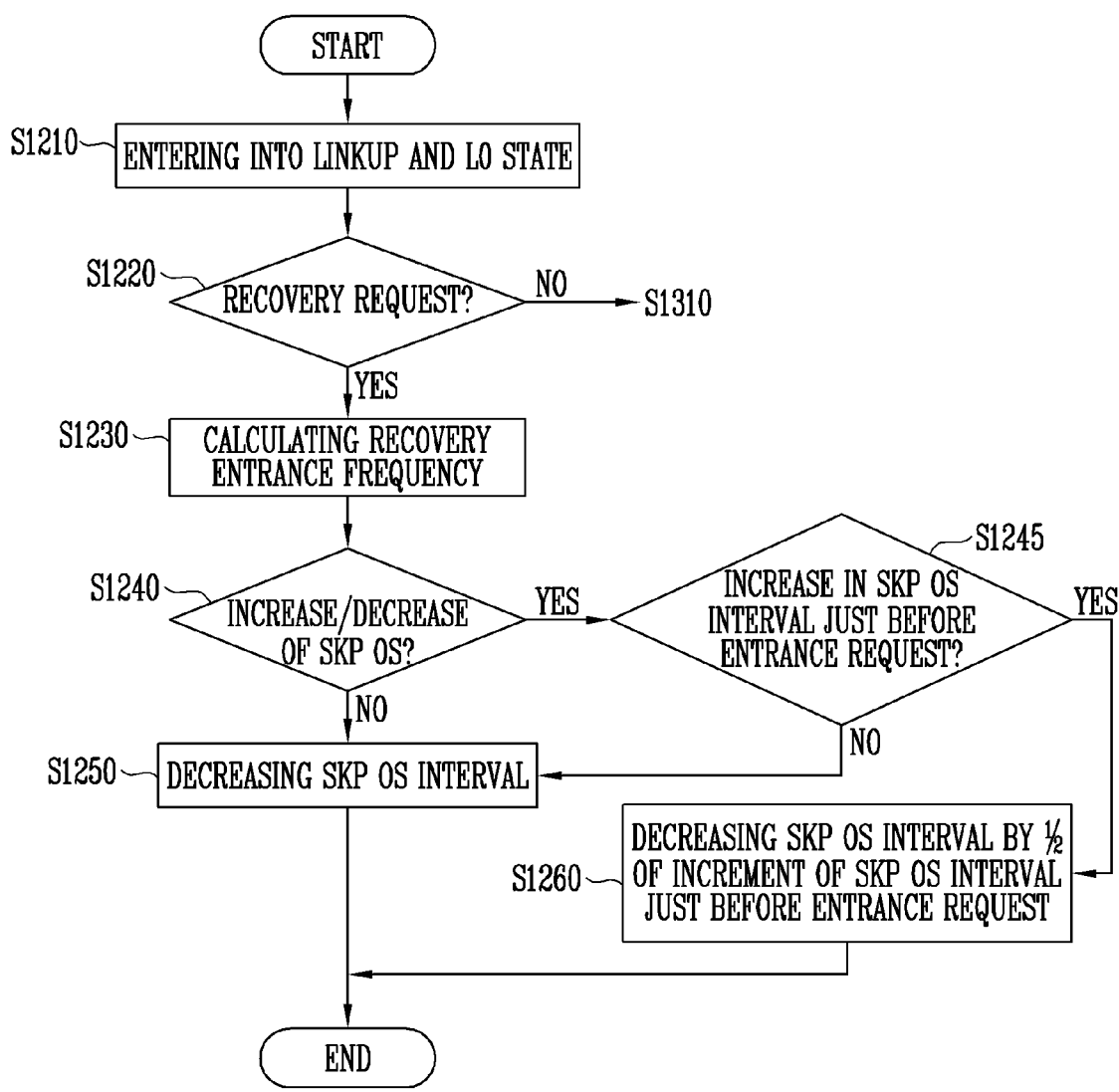
FIG. 12 is a diagram illustrating an operating method of the PCIe system in accordance with an embodiment of the disclosed technology.

FIG. 12 is a diagram illustrating an operating method of the PCIe system in accordance with an embodiment of the disclosed technology.

FIG. 12 illustrates an operating method that is performed when the PCIe system receives a recovery request. The PCIe system and an external device (e.g., another PCIe system) physically connected to the PCIe system may enter into a linkup and L0 state (S1210).

When the PCIe system receives a recovery state entrance request from a PCIe core or a PCIe host (S1220-Yes), the PCIe system may calculate a recovery state entrance frequency (S1230). In some implementations, the PCIe system may calculate an entrance request or entrance frequency into the recovery state per unit time. The recovery state entrance request may be made based on an SKP OS or an elastic buffer state of a reception side.

The PCIe system may determine whether an SKP OS transmission interval has been increased or decreased based on a transmission history of the SKP OS (S1240). The transmission history may include at least one of a change in the transmission interval or the recovery state entrance frequency corresponding to the transmission interval. When the PCIe system does not control the SKP OS transmission interval (S1240-No), the PCIe system may decrease the SKP OS transmission interval (S1250).

In some implementations, when the PCIe system controls the SKP OS transmission interval (S1240-Yes), the PCIe system may determine whether the SKP OS transmission interval has been increased just before the entrance request into the recovery state (S1245). When the PCIe system does not increase the SKP OS transmission interval just before the entrance request into the recovery state (S1245-No), the PCIe system may decrease the SKP OS transmission interval (S1250).

In some implementations, when the PCIe system increases the SKP OS transmission interval just before the entrance request into the recovery state (S1245-Yes), the PCIe system may decrease the SKP OS transmission interval by ½ of an increment of the SKP OS transmission interval just before the entrance request into the recovery state (S1260). That the PCIe system decreases the SKP OS transmission interval means that the PCIe system more frequently transmits the SKP OS. Therefore, that the PCIe system decreases the SKP OS transmission interval may mean that the PCIe system transmits a larger quantity of SKP OSs.

Figure 13:
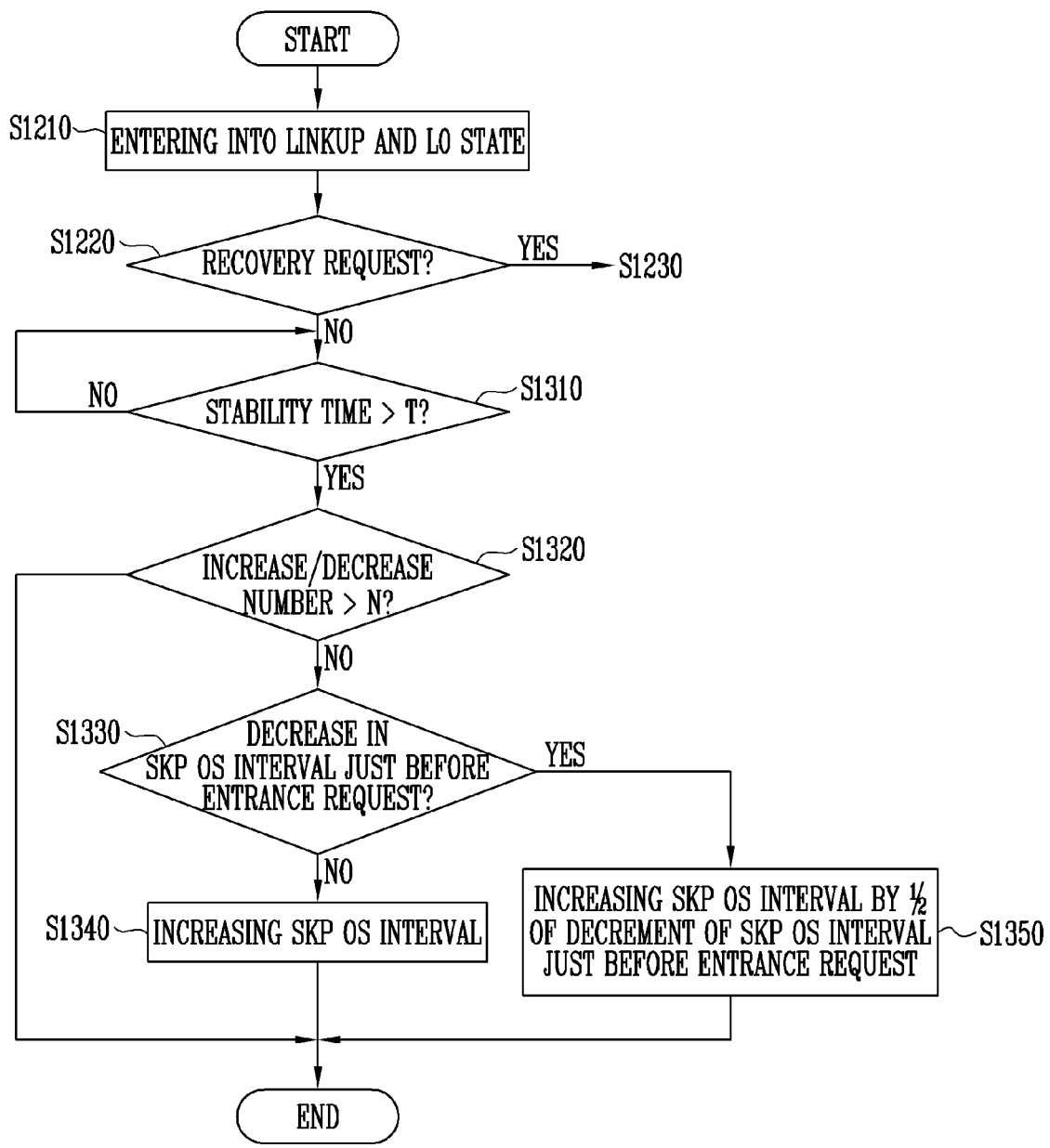
FIG. 13 is a diagram illustrating an operating method of the PCIe system in accordance with an embodiment of the disclosed technology.

FIG. 13 is a diagram illustrating an operating method of the PCIe system in accordance with an embodiment of the disclosed technology.

FIG. 13 illustrates an operating method that is performed when the PCIe system does not receive an entrance request into a recovery state. The PCIe system and an external device (e.g., another PCIe system) physically connected to the PCIe system may enter into a linkup and L0 state (S1210). Also, PCIe system may control a transmission interval of an SKP OS, even when the PCIe system does not receive a recovery state entrance request from a PCIe core or a PCIe host (S1220-No).

The PCIe system may be maintained in a stability state in which the PCIe system does not enter into the recovery state for a time exceeding a predetermined time T. The stability state is an L0 state, and may be a state in which the PCIe system smoothly communicates with an external device in a state in which a link is activated. When a stability time for which the stability state is maintained exceeds the predetermined time T (S1310-Yes), the PCIe system may compare an increase/decrease number of the transmission interval of the SKP OS with a predetermined number N (S1320).

When the increase/decrease number of the transmission interval of the SKP OS exceeds the predetermined number (S1320-Yes), the PCIe system may suspend the controlling of the transmission interval of the SKP OS. On the other hand, when the increase/decrease number of the transmission interval of the SKP OS is smaller than the predetermined number (S1320-No), the PCIe system may determine whether the SKP OS transmission interval has been decreased just before the recovery state entrance request (S1330).

When the PCIe system does not decrease the SKP OS transmission interval (S1330-No), the PCIe system may increase the SKP OS transmission interval so as to increase communication efficiency (S1340). Also, when the PCIe system decreases the SKP OS transmission interval (S1330-Yes), the PCIe system may increase the SKP OS transmission interval by ½ of a decrement of the SKP OS transmission interval just before the recovery state entrance request so as to increase the communication efficiency (S1350). That the PCIe system increases the SKP OS transmission interval means that the PCIe system more rarely transmits the SKP OS. Therefore, that the PCIe system increases the SKP OS transmission interval may mean that the PCIe system transmits a smaller quantity of SKP OSs.

In this specification, a protocol using the PCIe has been described in detail. However, the disclosed technology may be applied to protocols except the PCIe, which use dummy data corresponding to the SKP OS. That is, it will be apparent that the disclosed technology may be modified and embodied in protocols except the PCIe, which control dummy data or idle data so as to prevent underflow or overflow of the elastic buffer.

In accordance with the disclosed technology, there can be provided an improved PCIe interface and an interface system including the same.

While the disclosed technology has been shown and described with reference to certain exemplary embodiments thereof, it will be understood by those skilled in the art that various changes in form and details may be made therein without departing from the spirit and scope of the disclosed technology as defined by the appended claims and their equivalents. Therefore, the scope of the disclosed technology should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the disclosed technology, and the disclosed technology is not limited thereto. That is, it should be apparent to those skilled in the art that various modifications can be made on the basis of the technological scope of the disclosed technology.

The exemplary embodiments of the disclosed technology have been described in the drawings and specification. Variations and enhancements for the disclosed embodiments and other embodiments are possible based on what is disclosed and illustrated in this patent document.

What is claimed is:

1. A device, comprising:
    a transceiver configured to transmit and receive data; and
    a skip ordered set (SKP OS) control logic in communication with the transceiver and configured to generate an SKP OS and control the transceiver to transmit the SKP OS and a data block to a link connecting to an external device and including a plurality of lanes,
    wherein the SKP OS control logic is configured to increase or decrease a transmission interval of the SKP OS based on a transmission history including a history of adjusting of the transmission interval of the SKP OS, in response to an entry of the link to a recovery state that is used to recover the link from an error, and
    wherein the SKP OS control logic includes an SKP OS counter configured to count the transmission interval of the SKP OS.

2. The device of claim 1, wherein the SKP OS control logic includes:
    a central processing unit (CPU) configured to control the transceiver to increase or decrease the transmission interval of the SKP OS; and
    a register configured to store the transmission history.

3. The device of claim 1, wherein the transmission history includes at least one of the transmission interval of the SKP OS, a change in the transmission interval, and a frequency of an occurrence of the entry to the recovery state that corresponds to the transmission interval.

4. The device of claim 1, wherein the SKP OS control logic is further configured to calculate a frequency of an occurrence of the entry to the recovery state that corresponds to the transmission interval and increases or decreases the transmission interval of the SKP OS based on the frequency.

5. The device of claim 1, wherein the SKP OS control logic is configured to increase or decrease the transmission interval up to a predetermined number.

6. The device of claim 1, wherein the SKP OS control logic is further configured to fix the transmission interval in case that no request for the entry to the recovery state is received for a predetermined time.

7. The device of claim 1, wherein the SKP OS control logic is configured to decrease the transmission interval by ½ of an increment of the transmission interval in case that the entry into the recovery state corresponds to an increase in the transmission interval.

8. The device of claim 1, wherein the SKP OS control logic is configured to increase the transmission interval by ½ of a decrement of the transmission interval, when the entry into the recovery state corresponds to a decrease in the transmission interval.

9. The device of claim 1, wherein the SKP OS control logic is configured to increase or decrease the transmission interval of the SKP OS based on a state of an elastic buffer of the external device.

10. The device of claim 1, wherein the SKP OS includes a format according to a protocol based on a peripheral component interconnect express (PCIe) bus interface standard.

11. A system, comprising:
    a first peripheral component interconnect express (PCIe) device; and
    a second PCIe device coupled and communicated with the first PCIe device through a link including a plurality of lanes, wherein the first PCIe device is configured to generate a skip ordered set (SKP OS), and increase or decrease a transmission interval of the SKP OS based on a state of an elastic buffer of the second PCIe device and a transmission history including a history of adjusting of the transmission interval of the SKP OS in response to an entry of the link into a recovery state, and wherein the first PCIe device includes an SKP OS counter configured to count the transmission interval of the SKP OS.

12. The system of claim 11, wherein the elastic buffer is configured to temporarily stores the SKP OS received from the first PCIe device.

13. The system of claim 11, wherein the state of the elastic buffer includes an overflow state in which a volume of the elastic buffer becomes largest, an underflow state in which the volume of the elastic buffer becomes smallest, and a normal state free of an error for a predetermined time or more.

14. The system of claim 13, wherein the elastic buffer is configured to remove the SKP OS to prevent the overflow state.

15. The system of claim 13, wherein the elastic buffer is configured to add the SKP OS to prevent the underflow state.

16. The system of claim 13, wherein, in case that the elastic buffer is in the overflow state or the underflow state, the first PCIe device is configured to decrease the transmission interval of the SKP OS in response to the entry into the recovery state.

17. The system of claim 13, wherein the first PCIe device is configured to increase the transmission interval of the SKP OS in case that the elastic buffer is in the normal state after the entry into the recovery state.

18. The system of claim 11, wherein the transmission history includes at least one of the transmission interval of the SKP OS, a change in the transmission interval, and a frequency of an occurrence of the entry to the recovery state that corresponds to the transmission interval.

19. The system of claim 11, wherein the SKP OS includes a format according to a PCIe-based protocol.

20. A device, comprising:
a transceiver configured to transmit and receive data; and
a skip ordered set (SKP OS) control logic in communication with the transceiver and configured to generate an SKP OS and control the transceiver to transmit the SKP OS and a data block to a link connecting to an external device and including a plurality of lanes,
wherein the SKP OS control logic is configured to increase or decrease a transmission interval of the SKP OS based on a transmission history including a history of adjusting of the transmission interval of the SKP OS, in response to an entry of the link to a recovery state that is used to recover the link from an error, and
wherein the SKP OS control logic is further configured to fix the transmission interval in case that no request for the entry to the recovery state is received for a predetermined time.

* * * * *